Patented Dec. 24, 1946

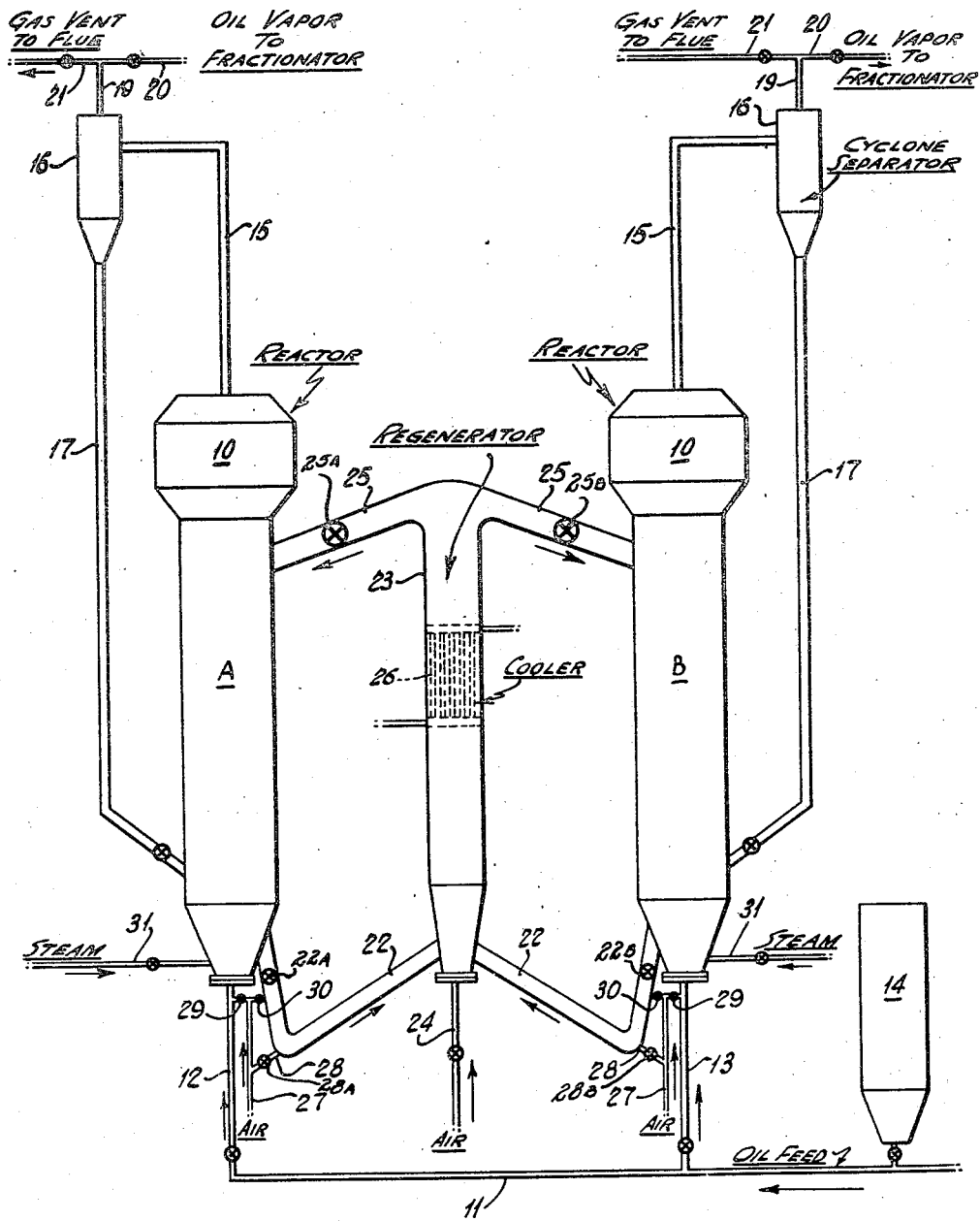

2,413,271

UNITED STATES PATENT OFFICE 2,413,271

CATALYTIC TREATMENT OF HYDROCARBONS

Halsted R. Warrick, West Englewood, N. J., assignor to The Texas Company, New York, N. Y., a corporation of Delaware Application September 27, 1944, Serial No. 555,996

3 Claims. (Cl. 196—52)

This invention relates to the treatment of hydrocarbons with solid catalysts in comminuted or finely divided form carried on in a plurality of reaction zones with alternating periods of processing and catalyst regeneration in each zone. In accordance with the invention the hydrocarbons in the processing period are flowed through the reaction zone in contact with catalyst dispersed or suspended in the flowing stream, the hydrocarbons being continuously removed from the reaction zone while the catalyst is retained therein and in the regenerating step the catalyst is dispersed or suspended in a stream of regenerating fluid to prepare the catalyst for the succeeding period of processing.

There may be said to be two general methods of treatment with solid catalysts, the fixed bed type and the fluid type. In the fixed bed method the hydrocarbon vapors are passed through a bed of catalyst; the processing is intermittent being interrupted with periodic intervals of catalyst regeneration in situ. In the fluid catalyst type the catalyst, in powdered form, is carried by the vapors in dispersion or suspension in the vapor stream; the catalyst is continuously separated from the vapors and passed to a regenerating chamber so that both processing and regeneration are carried on in a continuous manner. My invention seeks to avoid certain disadvantages of each of these types of operation and to provide a method of processing and regenerating in which certain limiting features of the previous methods of processing and regenerating are avoided and, particularly, to provide a process requiring less expensive equipment than that of the prior methods.

In the fixed bed operation it is necessary to either generate flue gas and provide flue gas circulation through the catalyst bed in order to avoid undue heating of the catalyst and to provide properly controlled burning of the carbonaceous deposit through the bed or to provide a molten salt bath to remove excess heat and thus keep the catalyst temperature in the proper range. In accordance with my invention the reactivation of the catalyst is conducted by flowing the catalyst in a stream of oxidizing gas and by having the catalyst particles in dispersion or suspension in the stream of oxidizing gas the need for flue gas circulation or molten salt bath to control the burning is entirely eliminated. Moreover, the pelleting or otherwise forming of the catalyst, which is required for a satisfactory fixed bed operation, is not required in my process.

In the fluid type method it is necessary to provide structure of considerable height, such as high standpipes, in order to handle the catalyst and insure delivery from the regenerating zone to the conversion zone; my invention avoids the use of expensive structure of this character. The invention may readily be practiced in equipment of low cost as compared with either the fixed bed or fluid type and consequently is especially adapted for small plants.

For the purpose of fully explaining the invention reference is now had to the accompanying drawing which is a diagrammatic elevation of apparatus adapted for the practice of the invention.

In the drawing a pair of reactors or treating chambers A and B are shown. Each chamber is preferably in the form of a vertically disposed chamber and each is advantageously provided with an upper section 10 of enlarged diameter to promote the disengagement of the hydrocarbon vapors from the catalyst. A feed line 11 has valved branches 12 and 13 extending respectively to reactors A and B for supplying the hydrocarbon feed. A catalyst hopper 14 is provided for supplying powdered or comminuted catalyst to the reactor in the hydrocarbon feed stream. A vapor line 15 extends from each reactor to a filter or separator 16, preferably in the form of a cyclone separator, for separating catalyst carried through the vapor line. The separated catalyst is returned through line 17 to the reaction chamber. A vapor line 19 extends from each of the separators 16 and is provided with a branch line 20 which extends to suitable fractionating equipment (not shown) for use during the processing period and a branch line 21 for removing combustion gases during the regenerating period.

Each of the reactors A and B is provided with a bottom draw-off line 22 for the withdrawal of catalyst. These lines are provided with valves 22A and 22B. The lines 22 extend to a regenerating chamber 23 which is preferably vertically disposed. A line 24 serves to introduce air or oxidizing gas to the chamber 23 to effect combustion of the carbonaceous deposit on the catalyst and accomplish the reactivation thereof. A line 25 extends from an upper portion of each of the reactors A and B to the chamber 23. The lines 25 are equipped with valves 25A and 25B. A heat exchanger 26 is provided for supplying cooling to the chamber 23 to prevent overheating the catalyst during regeneration; the heat exchanger preferably serves to generate steam for use in the process.

Below each reactor there is provided a line 27 for the introduction of air or oxidizing gas. The catalyst draw-off line 22 is preferably more or less in the form of an L to provide a downflow section through which the catalyst drops from the reactor. The air line 27 for reactor A is provided with a branch 28 having a valve 28A for introducing air at the bend of the line 22 so as to aspirate the catalyst and cause the circulation thereof through the chamber 23 and thence back to the reactor. The air line 27 for reactor B has a similar branch line 28, having a valve 28B, for introducing air at the bend of the line 22 for reactor B. Each line 27 preferably has an additional branch line 29 extending to the bottom of its respective reactor and a branch line 30 extending to the respective downflow leg of the line 22. Air through the branch lines 29 and 30 is admitted as may be necessary to prevent packing of the catalyst and aerate it so that it may be readily circulated by the aspirating stream admitted through line 28. Each reactor is provided with a line 31 for the admission of steam or inert gas for purging or for other purposes.

Assuming the reactor B to be in processing service and reactor A to be in regenerating service, the operation is conducted as follows:

With the valve 22B in line 22 and valve 25B in line 25 from reactor B closed, hydrocarbon vapors, heated to the desired temperature of treatment, pass through line 13 to the reactor B. In the initial processing period at the beginning of a run catalyst is introduced from the hopper 14 to the reactor in the stream of hydrocarbon feed until a sufficient quantity of catalyst has been charged to the reactor after which the delivery of catalyst may be stopped while the introduction of hydrocarbon feed is continued. In succeeding processing periods make-up catalyst may be introduced from time to time as may be needed to maintain the desired catalyst concentration. The comminuted or powdered catalyst is maintained dispersed or suspended in the upflowing vapors in the reaction chamber. In the disengaging head 10 a portion of the catalyst will be separated from the vapor stream which passes through the vapor line 15 to the cyclone separator 16. Additional catalyst is separated from the vapors in the cyclone separator and is returned through the line 17 to the reactor. The valve in the line 21 is closed and the valve in line 20 is open so that the vapors are delivered to the fractionator for separation into the desired products. Thus a continuous stream of hydrocarbon is passed through the reactor with the catalyst in dispersion or suspension in the vapor stream and the catalyst is retained in the reaction or treating zone during the processing step.

During the period when the treatment of the hydrocarbons is being carried on in reactor B regeneration of catalyst from a preceding processing step therein is being conducted in reactor A and chamber 23. The valve in the charging line 12 is closed and the valves 22A and 25A in the lines 22 and 25, respectively, from reactor A are open and air, introduced through line 28 and valve 28A, aspirates catalyst from reactor A and establishes and maintains a cyclic circulation of catalyst through line 22, chamber 23, line 25 and reactor A so that regeneration is conducted in both reactor A and chamber 23. Small quantities of additional air may be introduced through either or both of the lines 29 and 30 to aerate the catalyst in the lower section of the reactor and insure its withdrawal therefrom for circulation. Combustion gases pass through vapor line 15 to the cyclone separator wherein catalyst carried by the gases is separated and returned to the reactor through line 17 for continued circulation and regeneration. The valve in line 20 is closed and the valve in line 21 is open so that the combustion gases are removed from the system through line 21. Air is introduced through the line 28 at sufficient quantity and velocity to maintain the desired circulation of catalyst and such additional air is introduced through line 24 as may be necessary to maintain the desired combustion conditions. A cooling fluid is charged to the exchanger 26 to regulate the temperature of combustion during regeneration; thus water may be charged to the exchanger at a controlled rate to regulate the regenerating temperature and the resultant steam is employed in the process. In some cases it is advantageous to introduce steam as an additional coolant directly into contact with the fluidized catalyst undergoing regeneration.

In the preferred method of operation the catalyst is maintained constantly in a fluidized or dispersed condition during both processing and regeneration as well as during the periods of transition from one step to the other. Thus, at the end of the processing period, steam or inert gas is introduced into the reactor to displace the hydrocarbon vapors and to maintain the catalyst in a suspended or dispersed condition and then, while continuing the introduction of steam or inert gas, the introduction of air is commenced and, finally, the steam or inert gas is shut off and the flow of air continued. Similarly at the end of the regenerating period steam or inert gas is introduced to displace air and combustion gases and maintain the catalyst in a fluidized or suspended condition until the introduction of the hydrocarbon stream is underway. Thus, by the introduction of steam or inert gas, the catalyst is maintained in a fluidized or suspended state during the transitions between the several processing and regenerating periods.

Although the invention is described specifically herein as practiced in a pair of reactors or treating vessels it will be understood that any convenient number of reactors may be employed with the several processing and regenerating periods in the several reactors in proper rotation to provide a substantially continuous delivery of processed vapors to the fractionator.

This invention is adapted for various treatments of hydrocarbons such as catalytic cracking, reforming, hydroforming, dehydrogenation, desulfurization, isomerization, isoforming and polymerization and generally to the treatment of vapors or gases with finely divided or comminuted solid catalysts. Any of the usual fluid type catalysts may be employed. Coarse catalysts having average particle sizes of, for example, 50–100 mesh may be used to advantage, since the use of such catalysts reduces the load on the cyclone separators and also enables reductions in the sizes of equipment. The coarser catalysts are, moreover, particularly suitable for operations where high pressures are desired. Bead catalysts of similar particle sizes may be employed to advantage. The invention is especially adapted for the treatment of stocks which, under the conditions of treatment, are in a completely vaporous or gaseous state.

By way of example the invention may be described as applied to catalytic cracking. In this example the gas oil stock, free from heavy ends, having an endpoint of say about 700° F., is heated to suitable catalytic cracking temperatures, such as 800° F.–1000° F., and charged as a vaporous stream to the reactor. A synthetic silica alumina catalyst in the form of a dust or powder or in the form of small beads is fed in with the vaporous stream until a sufficient quantity of catalyst has been charged to the reactor whereupon the introduction of catalyst is stopped while the flow of vapors is continued. The vapors undergoing cracking pass through the cracking zone thence to the fractionating equipment for the recovery of the desired products. The catalyst is maintained in a suspended or dispersed condition in the vapors undergoing cracking and is retained in the reaction zone during the processing step except for such minor quantities as may pass with the vapors beyond the cyclone separator. The processing step is continued for a time which may range from minimum periods, as about ten minutes, to maximum periods of two to four hours. In the case of the longer periods of operation make-up catalyst may be added as needed to maintain the desired concentration of catalyst in the cracking zone. At the end of the processing period the hydrocarbon feed is switched to another reactor for processing therein and steam is introduced into the first reactor to displace the hydrocarbon vapors and to maintain the catalyst in a suspended state. While continuing the introduction of steam the introduction of air is commenced and, finally, the steam is shut off while the flow of air is continued. The catalyst is maintained in cyclic circulation while sufficient cooling is applied to maintain the catalyst at a temperature of about 1050° F. which is adequate to effect satisfactory combustion of carbonaceous material without injuring the structure of the catalyst. The operation is continued with alternating periods of processing and regeneration in the several reactors and with the addition of make-up catalyst from time to time as may be required.

Although a preferred embodiment of the invention has been described herein, it will be understood that various changes and modifications may be made therein, while securing to a greater or less extent some or all of the benefits of the invention, without departing from the spirit and scope thereof.

I claim:

1. In the catalytic conversion of hydrocarbons and reactivation of catalyst conducted in a plurality of reactors and an associated chamber used alternatively with said reactors for catalyst reactivation, the process that comprises processing the hydrocarbons in one of said reactors by charging hydrocarbon vapors into the lower portion thereof, by continuously charging the hydrocarbon vapors and passing the vapors at conversion temperature upwardly through said reactor in contact with comminuted catalyst held in suspension in the vapors to subject the vapors to catalytic conversion and by retaining catalyst in the reactor in suspension in the current of upwardly flowing vapors while passing the vapors overhead from the reactor, simultaneously reactivating used catalyst in a second reactor by establishing and maintaining a cyclic passage of the used catalyst through the latter reactor and said associated chamber in suspension in a current of oxidizing gas and by withdrawing resultant combustion gases while maintaining catalyst in cyclic passage, then discontinuing the processing in the first reactor and the reactivation in the second reactor and associated chamber, diverting the charge of hydrocarbon vapors to the second reactor and subjecting the vapors to processing therein in the manner of processing hereinbefore specified and subjecting the used catalyst in the first reactor to reactivation by cyclic passage in the first reactor and said associated chamber in the manner of reactivating hereinbefore specified.

2. In the catalytic conversion of hydrocarbons and reactivation of catalyst conducted in a plurality of reactors and an associated chamber used alternatively with said reactors for catalyst reactivation, the process that comprises processing the hydrocarbons in one of said reactors by charging hydrocarbon vapors into the lower portion thereof, by continuously charging the hydrocarbon vapors and passing the vapors at conversion temperature upwardly through said reactor in contact with comminuted catalyst held in suspension in the vapors to subject the vapors to catalytic conversion and by retaining catalyst in the reactor in suspension in the current of upwardly flowing vapors while passing the vapors overhead from the reactor, simultaneously reactivating used catalyst in a second reactor by establishing and maintaining a cyclic passage of the used catalyst through the latter reactor and said associated chamber in suspension in a current of oxidizing gas and by withdrawing resultant combustion gases while maintaining catalyst in cyclic passage, then discontinuing the processing in the first reactor and the reactivation in the second reactor and associated chamber, diverting the charge of hydrocarbon vapors to the second reactor and subjecting the vapors to processing therein in the manner of processing hereinbefore specified, subjecting the used catalyst in the first reactor to reactivation by cyclic passage in the first reactor and said associated chamber in the manner of reactivating hereinbefore specified and introducing a purging gas during the transition periods from processing to reactivating and from reactivating to processing to maintain the catalyst in suspension.

3. In the catalytic conversion of hydrocarbons and reactivation of catalyst conducted in a plurality of reactors and an associated chamber used alternatively with said reactors for catalyst reactivation, the process that comprises processing the hydrocarbons in one of said reactors by charging hydrocarbon vapors into the lower portion thereof, by continuously charging the hydrocarbon vapors and passing the vapors at conversion temperature upwardly through said reactor in contact with comminuted catalyst held in suspension in the vapors to subject the vapors to catalytic conversion and by retaining catalyst in the reactor in suspension in the current of upwardly flowing vapors while passing the vapors overhead from the reactor, simultaneously reactivating used catalyst in a second reactor by establishing and maintaining a cyclic passage of the used catalyst through the latter reactor and said associated chamber in suspension in a current of oxidizing gas, by applying cooling to a portion of said cyclic passage to maintain the desired temperature of reactivation and by withdrawing resultant combustion gases while maintaining catalyst in cyclic passage, then discontinuing the processing in the first reactor and the reactivation in the second reactor and associated chamber, diverting the charge of hydrocarbon vapors to the second reactor and subjecting the vapors to processing therein in the manner of processing hereinbefore specified and subjecting the used catalyst in the first reactor to reactivation by cyclic passage in the first reactor and said associated chamber in the manner of reactivating hereinbefore specified.

HALSTED R. WARRICK.